US012761821B2

(12) United States Patent
Lu et al.

(10) Patent No.: US 12,761,821 B2
(45) Date of Patent: Oct. 13, 2026

(54) APPARATUSES AND METHODS FOR PER-ROW COUNT BASED REFRESH TARGET IDENTIFICATION

(71) Applicant: Micron Technology, Inc., Boise, ID (US)

(72) Inventors: Yang Lu, Boise, ID (US); Yuan He, Boise, ID (US); Kang-Yong Kim, Boise, ID (US); Randall J. Rooney, Boise, ID (US); Dong Pan, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/743,783

(22) Filed: Jun. 14, 2024

(65) Prior Publication Data

US 2025/0068345 A1 Feb. 27, 2025

Related U.S. Application Data

(60) Provisional application No. 63/578,596, filed on Aug. 24, 2023.

(51) Int. Cl.
*G06F 3/06* (2006.01)

(52) U.S. Cl.
CPC .......... *G06F 3/0632* (2013.01); *G06F 3/0604* (2013.01); *G06F 3/0673* (2013.01)

(58) Field of Classification Search
CPC .................................................... G11C 11/406
See application file for complete search history.

(56) References Cited

U.S. PATENT DOCUMENTS

| | | | |
|---|---|---|---|
| 3,633,175 | A | 1/1972 | Harper |
| 4,679,173 | A | 7/1987 | Sato |
| 5,089,957 | A | 2/1992 | Stultz et al. |
| 5,291,198 | A | 3/1994 | Dingwall et al. |
| 5,299,159 | A | 3/1994 | Balistreri et al. |
| 5,422,850 | A | 6/1995 | Sukegawa et al. |
| 5,617,348 | A | 4/1997 | Maguire |
| 5,638,317 | A | 6/1997 | Tran |
| 5,699,297 | A | 12/1997 | Yamazaki et al. |

(Continued)

FOREIGN PATENT DOCUMENTS

| | | | |
|---|---|---|---|
| CN | 1144434 | A | 3/1997 |
| CN | 1195173 | A | 10/1998 |

(Continued)

OTHER PUBLICATIONS

US 11,264,075 B2, 03/2022, Bell et al. (withdrawn)

(Continued)

*Primary Examiner* — Edward J Dudek, Jr.
(74) *Attorney, Agent, or Firm* — Dorsey & Whitney LLP

(57) ABSTRACT

Apparatuses and methods per-row count based refresh target identification. A memory device stores count values associated with the word lines. An aggressor detector circuit stores a maximum of the count values and a row address associated with the maximum count value. Responsive to a targeted refresh signal, the stored count value is compared to a threshold. If the count value has crossed the threshold, then a targeted refresh operation may be performed on one or more refresh addresses based on the stored address, and the count value may be reset.

16 Claims, 5 Drawing Sheets

(56) References Cited

U.S. PATENT DOCUMENTS

| | | | |
|---|---|---|---|
| 5,751,655 | A | 5/1998 | Yamazaki et al. |
| 5,768,196 | A | 6/1998 | Bloker et al. |
| 5,874,907 | A | 2/1999 | Craft |
| 5,933,377 | A | 8/1999 | Hidaka |
| 5,943,283 | A | 8/1999 | Wong et al. |
| 5,970,507 | A | 10/1999 | Kato et al. |
| 5,999,471 | A | 12/1999 | Choi |
| 6,002,629 | A | 12/1999 | Kim et al. |
| 6,011,734 | A | 1/2000 | Pappert |
| 6,061,290 | A | 5/2000 | Shirley |
| 6,212,118 | B1 | 4/2001 | Fujita |
| 6,310,806 | B1 | 10/2001 | Higashi et al. |
| 6,317,381 | B1 | 11/2001 | Gans et al. |
| 6,338,154 | B2 | 1/2002 | Kim |
| 6,373,738 | B1 | 4/2002 | Towler et al. |
| 6,392,952 | B1 | 5/2002 | Chen et al. |
| 6,424,582 | B1 | 7/2002 | Ooishi |
| 6,434,064 | B2 | 8/2002 | Nagai |
| 6,452,868 | B1 | 9/2002 | Fister |
| 6,480,931 | B1 | 11/2002 | Buti et al. |
| 6,515,928 | B2 | 2/2003 | Sato et al. |
| 6,567,340 | B1 | 5/2003 | Nataraj et al. |
| 6,950,364 | B2 | 9/2005 | Kim |
| 7,027,343 | B2 | 4/2006 | Sinha et al. |
| 7,057,960 | B1 | 6/2006 | Fiscus et al. |
| 7,082,070 | B2 | 7/2006 | Hong |
| 7,187,607 | B2 | 3/2007 | Koshikawa et al. |
| 7,203,113 | B2 | 4/2007 | Takahashi et al. |
| 7,203,115 | B2 | 4/2007 | Eto et al. |
| 7,209,402 | B2 | 4/2007 | Shinozaki et al. |
| 7,215,588 | B2 | 5/2007 | Lee |
| 7,283,380 | B1 | 10/2007 | Srinivasan et al. |
| 7,304,875 | B1 | 12/2007 | Lien et al. |
| 7,319,602 | B1 | 1/2008 | Srinivasan et al. |
| 7,444,577 | B2 | 10/2008 | Best et al. |
| 7,551,502 | B2 | 6/2009 | Dono et al. |
| 7,565,479 | B2 | 7/2009 | Best et al. |
| 7,830,742 | B2 | 11/2010 | Han |
| 7,870,362 | B2 | 1/2011 | Hong et al. |
| 7,872,907 | B2 | 1/2011 | Okayama et al. |
| 8,174,921 | B2 | 5/2012 | Kim et al. |
| 8,400,805 | B2 | 3/2013 | Yoko |
| 8,451,677 | B2 | 5/2013 | Okahiro et al. |
| 8,625,360 | B2 | 1/2014 | Iwamoto et al. |
| 8,676,725 | B1 | 3/2014 | Lin et al. |
| 8,681,578 | B2 | 3/2014 | Narui |
| 8,756,368 | B2 | 6/2014 | Best et al. |
| 8,811,100 | B2 | 8/2014 | Ku |
| 8,862,973 | B2 | 10/2014 | Zimmerman et al. |
| 8,938,573 | B2 | 1/2015 | Greenfield et al. |
| 9,032,141 | B2 | 5/2015 | Bains et al. |
| 9,047,978 | B2 | 6/2015 | Bell et al. |
| 9,058,900 | B2 | 6/2015 | Kang |
| 9,087,554 | B1 | 7/2015 | Park |
| 9,087,602 | B2 | 7/2015 | Youn et al. |
| 9,117,544 | B2 | 8/2015 | Bains et al. |
| 9,123,447 | B2 | 9/2015 | Lee et al. |
| 9,153,294 | B2 | 10/2015 | Kang |
| 9,190,137 | B2 | 11/2015 | Kim et al. |
| 9,190,139 | B2 | 11/2015 | Jung et al. |
| 9,251,885 | B2 | 2/2016 | Greenfield et al. |
| 9,286,964 | B2 | 3/2016 | Halbert et al. |
| 9,299,457 | B2 | 3/2016 | Chun et al. |
| 9,311,985 | B2 | 4/2016 | Lee et al. |
| 9,324,398 | B2 | 4/2016 | Jones et al. |
| 9,384,821 | B2 | 7/2016 | Bains et al. |
| 9,390,782 | B2 | 7/2016 | Best et al. |
| 9,412,432 | B2 | 8/2016 | Narui et al. |
| 9,418,741 | B1 | 8/2016 | Ramaraju et al. |
| 9,424,907 | B2 | 8/2016 | Fujishiro |
| 9,449,675 | B2 | 9/2016 | Wheeler |
| 9,484,079 | B2 | 11/2016 | Lee |
| 9,514,850 | B2 | 12/2016 | Kim |
| 9,570,143 | B2 | 2/2017 | Lim et al. |
| 9,646,672 | B1 | 5/2017 | Kim et al. |
| 9,672,889 | B2 | 6/2017 | Lee et al. |
| 9,685,240 | B1 | 6/2017 | Park |
| 9,691,466 | B1 | 6/2017 | Kim |
| 9,697,913 | B1 | 7/2017 | Mariani et al. |
| 9,734,887 | B1 | 8/2017 | Tavva |
| 9,741,409 | B2 | 8/2017 | Jones et al. |
| 9,741,447 | B2 | 8/2017 | Akamatsu |
| 9,747,971 | B2 | 8/2017 | Bains et al. |
| 9,761,297 | B1 | 9/2017 | Tomishima |
| 9,786,351 | B2 | 10/2017 | Lee et al. |
| 9,799,391 | B1 | 10/2017 | Wei |
| 9,805,782 | B1 | 10/2017 | Liou |
| 9,805,783 | B2 | 10/2017 | Ito et al. |
| 9,818,469 | B1 | 11/2017 | Kim et al. |
| 9,847,118 | B1 | 12/2017 | Won |
| 9,865,326 | B2 | 1/2018 | Bains et al. |
| 9,865,328 | B1 | 1/2018 | Desimone et al. |
| 9,922,694 | B2 | 3/2018 | Akamatsu |
| 9,934,143 | B2 | 4/2018 | Bains et al. |
| 9,953,696 | B2 | 4/2018 | Kim |
| 10,032,501 | B2 | 7/2018 | Ito et al. |
| 10,083,737 | B2 | 9/2018 | Bains et al. |
| 10,090,038 | B2 | 10/2018 | Shin |
| 10,134,461 | B2 | 11/2018 | Bell et al. |
| 10,147,472 | B2 | 12/2018 | Jones et al. |
| 10,153,031 | B2 | 12/2018 | Akamatsu |
| 10,170,174 | B1 | 1/2019 | Ito et al. |
| 10,176,860 | B1 | 1/2019 | Mylavarapu |
| 10,210,925 | B2 | 2/2019 | Bains et al. |
| 10,297,305 | B1 | 5/2019 | Moon et al. |
| 10,339,994 | B2 | 7/2019 | Ito et al. |
| 10,381,327 | B2 | 8/2019 | Ramachandra et al. |
| 10,387,276 | B2 | 8/2019 | Ryu et al. |
| 10,446,216 | B2 | 10/2019 | Oh et al. |
| 10,490,250 | B1 | 11/2019 | Ito et al. |
| 10,490,251 | B2 | 11/2019 | Wolff |
| 10,600,462 | B2 | 3/2020 | Augustine et al. |
| 10,600,491 | B2 | 3/2020 | Chou et al. |
| 10,607,686 | B2 | 3/2020 | Akamatsu |
| 10,629,286 | B2 | 4/2020 | Lee et al. |
| 10,679,710 | B2 | 6/2020 | Hirashima et al. |
| 10,705,900 | B2 | 7/2020 | Jin |
| 10,770,127 | B2 | 9/2020 | Shore et al. |
| 10,811,066 | B2 | 10/2020 | Jones et al. |
| 10,832,792 | B1 | 11/2020 | Penney et al. |
| 10,861,519 | B2 | 12/2020 | Jones et al. |
| 10,867,660 | B2 | 12/2020 | Akamatsu |
| 10,930,335 | B2 | 2/2021 | Bell et al. |
| 10,943,636 | B1 | 3/2021 | Wu et al. |
| 10,950,289 | B2 | 3/2021 | Ito et al. |
| 10,964,378 | B2 | 3/2021 | Ayyapureddi et al. |
| 11,011,215 | B1 | 5/2021 | Parry et al. |
| 11,043,254 | B2 | 6/2021 | Enomoto et al. |
| 11,139,015 | B2 | 10/2021 | Brown et al. |
| 11,152,050 | B2 | 10/2021 | Morohashi et al. |
| 11,158,364 | B2 | 10/2021 | Penney et al. |
| 11,158,373 | B2 | 10/2021 | Penney et al. |
| 11,200,942 | B2 | 12/2021 | Jenkinson et al. |
| 11,222,682 | B1 | 1/2022 | Enomoto et al. |
| 11,257,535 | B2 | 2/2022 | Shore et al. |
| 11,264,096 | B2 | 3/2022 | Schreck et al. |
| 11,322,192 | B2 | 5/2022 | Morohashi et al. |
| 11,361,808 | B2 | 6/2022 | Bell et al. |
| 11,386,946 | B2 | 7/2022 | Ayyapureddi et al. |
| 11,398,265 | B2 | 7/2022 | Wu et al. |
| 11,424,005 | B2 | 8/2022 | Penney et al. |
| 11,462,291 | B2 | 10/2022 | Pan |
| 11,482,275 | B2 | 10/2022 | Ayyapureddi et al. |
| 11,521,669 | B2 | 12/2022 | Enomoto et al. |
| 11,532,336 | B2 | 12/2022 | Choi et al. |
| 11,568,917 | B1 | 1/2023 | Shin et al. |
| 11,568,918 | B2 | 1/2023 | Ayyapureddi et al. |
| 11,600,314 | B2 | 3/2023 | Ayyapureddi et al. |
| 11,600,326 | B2 | 3/2023 | Schreck et al. |
| 11,664,063 | B2 | 5/2023 | Lovett |
| 11,688,451 | B2 | 6/2023 | Zhang et al. |
| 11,694,738 | B2 | 7/2023 | Morohashi et al. |
| 11,699,476 | B2 | 7/2023 | Brown et al. |
| 11,810,612 | B2 | 11/2023 | Roberts |

(56) References Cited

U.S. PATENT DOCUMENTS 11,854,618 B2 12/2023 Penney
11,984,148 B2 5/2024 Penney et al.
12,165,687 B2 12/2024 He et al.
12,217,813 B2 2/2025 Pan
12,236,996 B2 2/2025 Lee et al.
12,406,717 B2 9/2025 Ayyapureddi et al.
12,592,271 B2 3/2026 Akamatsu et al.
2001/0008498 A1 7/2001 Ooishi
2002/0007476 A1 1/2002 Kishino
2002/0078311 A1 6/2002 Matsuzaki et al.
2002/0080677 A1 6/2002 Watanabe et al.
2002/0181301 A1 12/2002 Takahashi et al.
2003/0063512 A1 4/2003 Takahashi et al.
2003/0067825 A1 4/2003 Shimano et al.
2003/0090400 A1 5/2003 Barker
2003/0095459 A1 5/2003 Derner et al.
2003/0123301 A1 7/2003 Jang et al.
2003/0193829 A1 10/2003 Morgan et al.
2003/0231540 A1 12/2003 Lazar et al.
2004/0004856 A1 1/2004 Sakimura et al.
2004/0008544 A1 1/2004 Shinozaki et al.
2004/0022093 A1 2/2004 Lee
2004/0052142 A1 3/2004 Ikehashi et al.
2004/0114446 A1 6/2004 Takahashi et al.
2004/0130959 A1 7/2004 Kawaguchi
2004/0174757 A1 9/2004 Garverick et al.
2004/0184323 A1 9/2004 Mori et al.
2004/0213035 A1 10/2004 Cavaleri et al.
2004/0218431 A1 11/2004 Chung et al.
2005/0041502 A1 2/2005 Perner
2005/0105315 A1 5/2005 Shin et al.
2005/0243629 A1 11/2005 Lee
2005/0265104 A1 12/2005 Remaklus et al.
2006/0039229 A1 2/2006 Nakano
2006/0059196 A1 3/2006 Sato et al.
2006/0083099 A1 4/2006 Bae et al.
2006/0087903 A1 4/2006 Riho et al.
2006/0119406 A1 6/2006 Henzler et al.
2006/0176744 A1 8/2006 Stave
2006/0262616 A1 11/2006 Chen
2007/0008799 A1 1/2007 Dono et al.
2007/0014174 A1 1/2007 Ohsawa
2007/0028068 A1 2/2007 Golding et al.
2007/0030746 A1 2/2007 Best et al.
2007/0033339 A1 2/2007 Best et al.
2007/0133330 A1 6/2007 Ohsawa
2007/0153611 A1 7/2007 Lee
2007/0230264 A1 10/2007 Eto
2007/0237016 A1 10/2007 Miyamoto et al.
2007/0297252 A1 12/2007 Singh
2008/0028260 A1 1/2008 Oyagi et al.
2008/0031068 A1 2/2008 Yoo et al.
2008/0062742 A1 3/2008 Wang
2008/0126893 A1 5/2008 Harrand et al.
2008/0130394 A1 6/2008 Dono et al.
2008/0181048 A1 7/2008 Han
2008/0224742 A1 9/2008 Pomichter
2008/0253212 A1 10/2008 Iida et al.
2008/0266990 A1 10/2008 Loeffler
2008/0288720 A1 11/2008 Atwal et al.
2008/0301362 A1 12/2008 Cavanna et al.
2008/0313494 A1 12/2008 Hummler et al.
2008/0316845 A1 12/2008 Wang et al.
2009/0021999 A1 1/2009 Tanimura et al.
2009/0059641 A1 3/2009 Jeddeloh
2009/0077571 A1 3/2009 Gara et al.
2009/0161457 A1 6/2009 Wakimoto
2009/0168571 A1 7/2009 Pyo et al.
2009/0185440 A1 7/2009 Lee
2009/0201752 A1 8/2009 Riho et al.
2009/0213675 A1 8/2009 Shino
2009/0251971 A1 10/2009 Futatsuyama
2009/0296510 A1 12/2009 Lee et al.
2010/0005217 A1 1/2010 Jeddeloh
2010/0005376 A1 1/2010 Laberge et al.
2010/0054011 A1 3/2010 Kim
2010/0074042 A1 3/2010 Fukuda et al.
2010/0080074 A1 4/2010 Ohmaru et al.
2010/0110809 A1 5/2010 Kobayashi et al.
2010/0110810 A1 5/2010 Kobayashi
2010/0131812 A1 5/2010 Mohammad
2010/0157693 A1 6/2010 Iwai et al.
2010/0182863 A1 7/2010 Fukiage
2010/0260003 A1 10/2010 Oh
2010/0329069 A1 12/2010 Ito et al.
2011/0026290 A1 2/2011 Noda et al.
2011/0051530 A1 3/2011 Kushida
2011/0055495 A1 3/2011 Remaklus et al.
2011/0069572 A1 3/2011 Lee et al.
2011/0122987 A1 5/2011 Neyer
2011/0216614 A1 9/2011 Hosoe
2011/0225355 A1 9/2011 Kajigaya
2011/0286271 A1 11/2011 Chen
2011/0310648 A1 12/2011 Iwamoto et al.
2011/0317462 A1 12/2011 Gyllenhammer et al.
2012/0014199 A1 1/2012 Narui
2012/0059984 A1 3/2012 Kang et al.
2012/0151131 A1 6/2012 Kilmer et al.
2012/0213021 A1 8/2012 Riho et al.
2012/0254472 A1 10/2012 Ware et al.
2013/0003467 A1 1/2013 Klein
2013/0003477 A1 1/2013 Park et al.
2013/0015578 A1* 1/2013 Thacker .................. H01L 24/16
257/738
2013/0057173 A1 3/2013 Yao et al.
2013/0107623 A1 5/2013 Kavalipurapu et al.
2013/0173971 A1 7/2013 Zimmerman
2013/0254475 A1 9/2013 Perego et al.
2013/0279284 A1 10/2013 Jeong
2013/0304982 A1 11/2013 Jung et al.
2014/0006703 A1 1/2014 Bains et al.
2014/0006704 A1 1/2014 Greenfield et al.
2014/0013169 A1 1/2014 Kobla et al.
2014/0013185 A1 1/2014 Kobla et al.
2014/0050004 A1 2/2014 Mochida
2014/0078841 A1 3/2014 Chopra
2014/0078842 A1 3/2014 Oh et al.
2014/0078845 A1 3/2014 Song
2014/0085995 A1 3/2014 Greenfield et al.
2014/0089576 A1 3/2014 Bains et al.
2014/0095780 A1 4/2014 Bains et al.
2014/0095786 A1 4/2014 Moon et al.
2014/0119091 A1 5/2014 You et al.
2014/0136763 A1 5/2014 Li et al.
2014/0143473 A1 5/2014 Kim et al.
2014/0156923 A1 6/2014 Bains et al.
2014/0177346 A1 6/2014 Gupta et al.
2014/0177370 A1 6/2014 Halbert et al.
2014/0177376 A1 6/2014 Song
2014/0189215 A1 7/2014 Kang et al.
2014/0189228 A1 7/2014 Greenfield et al.
2014/0219043 A1 8/2014 Jones et al.
2014/0237307 A1 8/2014 Kobla et al.
2014/0241099 A1 8/2014 Seo et al.
2014/0254298 A1 9/2014 Dally
2014/0269009 A1 9/2014 Ghosh et al.
2014/0269021 A1 9/2014 Yang et al.
2014/0281206 A1 9/2014 Crawford et al.
2014/0281207 A1 9/2014 Mandava et al.
2014/0292375 A1 10/2014 Angelini et al.
2014/0293725 A1 10/2014 Best et al.
2014/0317344 A1 10/2014 Kim
2014/0355332 A1 12/2014 Youn et al.
2014/0369109 A1 12/2014 Lee et al.
2014/0379978 A1 12/2014 Kim et al.
2015/0049567 A1 2/2015 Chi
2015/0055420 A1 2/2015 Bell et al.
2015/0063016 A1 3/2015 Shimizu
2015/0078112 A1 3/2015 Huang
2015/0089326 A1 3/2015 Joo et al.
2015/0155027 A1 6/2015 Abe et al.
2015/0162067 A1 6/2015 Kim et al.
2015/0170728 A1 6/2015 Jung et al.
2015/0199126 A1 7/2015 Jayasena et al.

(56) References Cited

U.S. PATENT DOCUMENTS

2015/0206572 A1 7/2015 Lim et al.
2015/0213872 A1 7/2015 Mazumder et al.
2015/0213877 A1 7/2015 Darel
2015/0228341 A1 8/2015 Watanabe et al.
2015/0243339 A1 8/2015 Bell et al.
2015/0255140 A1 9/2015 Song
2015/0262652 A1 9/2015 Igarashi
2015/0279441 A1 10/2015 Greenberg et al.
2015/0279442 A1 10/2015 Hwang
2015/0294711 A1 10/2015 Gaither et al.
2015/0340077 A1 11/2015 Akamatsu
2015/0356048 A1 12/2015 King
2015/0371699 A1 12/2015 Lee et al.
2016/0019940 A1 1/2016 Jang et al.
2016/0027498 A1 1/2016 Ware et al.
2016/0027531 A1 1/2016 Jones et al.
2016/0027532 A1 1/2016 Kim
2016/0042782 A1 2/2016 Narui et al.
2016/0071581 A1 3/2016 Lee
2016/0078845 A1 3/2016 Lin et al.
2016/0078911 A1 3/2016 Fujiwara et al.
2016/0078918 A1 3/2016 Hyun et al.
2016/0085466 A1 3/2016 Benedict et al.
2016/0086649 A1 3/2016 Hong et al.
2016/0086651 A1 3/2016 Kim
2016/0093402 A1 3/2016 Kitagawa et al.
2016/0099043 A1 4/2016 Tu
2016/0111140 A1 4/2016 Joo et al.
2016/0125931 A1 5/2016 Doo et al.
2016/0133314 A1 5/2016 Hwang et al.
2016/0140243 A1 5/2016 Adams et al.
2016/0163372 A1 6/2016 Lee et al.
2016/0172056 A1 6/2016 Huh
2016/0180917 A1 6/2016 Chishti et al.
2016/0180921 A1 6/2016 Jeong
2016/0196863 A1 7/2016 Shin et al.
2016/0202926 A1 7/2016 Benedict
2016/0211008 A1 7/2016 Benedict et al.
2016/0224262 A1 8/2016 Mandava et al.
2016/0225433 A1 8/2016 Bains et al.
2016/0225461 A1 8/2016 Tuers et al.
2016/0246525 A1* 8/2016 Jeffrey .................. G06F 3/0653
2016/0336060 A1 11/2016 Shin
2016/0343423 A1 11/2016 Shido
2017/0011792 A1 1/2017 Oh et al.
2017/0076779 A1 3/2017 Bains et al.
2017/0092350 A1 3/2017 Halbert et al.
2017/0117030 A1 4/2017 Fisch et al.
2017/0133085 A1 5/2017 Kim et al.
2017/0139641 A1 5/2017 Cha et al.
2017/0140807 A1 5/2017 Sun et al.
2017/0140811 A1 5/2017 Joo
2017/0148504 A1 5/2017 Saifuddin et al.
2017/0177246 A1 6/2017 Miller et al.
2017/0186481 A1 6/2017 Oh et al.
2017/0213586 A1 7/2017 Kang et al.
2017/0221546 A1 8/2017 Loh et al.
2017/0263305 A1 9/2017 Cho
2017/0287547 A1 10/2017 Ito et al.
2017/0323675 A1 11/2017 Jones et al.
2017/0352399 A1 12/2017 Yokoyama et al.
2017/0371742 A1 12/2017 Shim et al.
2017/0372767 A1 12/2017 Kang et al.
2018/0004592 A1 1/2018 Bains et al.
2018/0005690 A1 1/2018 Morgan et al.
2018/0025770 A1 1/2018 Ito et al.
2018/0025772 A1 1/2018 Lee et al.
2018/0060194 A1 3/2018 Ryu et al.
2018/0061483 A1 3/2018 Morgan
2018/0082737 A1 3/2018 Lee
2018/0084314 A1 3/2018 Koyama
2018/0090199 A1 3/2018 Kim et al.
2018/0096719 A1 4/2018 Tomishima et al.
2018/0102776 A1 4/2018 Chandrasekar et al.
2018/0107417 A1 4/2018 Shechter et al.
2018/0114561 A1 4/2018 Fisch et al.
2018/0114565 A1 4/2018 Lee
2018/0158504 A1 6/2018 Akamatsu
2018/0158507 A1 6/2018 Bang
2018/0182445 A1 6/2018 Lee et al.
2018/0203621 A1 7/2018 Ahn et al.
2018/0218767 A1 8/2018 Wolff
2018/0261268 A1 9/2018 Hyun et al.
2018/0294028 A1 10/2018 Lee et al.
2018/0308539 A1 10/2018 Ito et al.
2018/0341553 A1 11/2018 Koudele et al.
2018/0342282 A1 11/2018 Morgan
2018/0366182 A1 12/2018 Hyun et al.
2019/0013059 A1 1/2019 Akamatsu
2019/0043558 A1 2/2019 Suh et al.
2019/0051344 A1 2/2019 Bell et al.
2019/0066759 A1 2/2019 Nale
2019/0066762 A1 2/2019 Koya
2019/0066808 A1 2/2019 Nale
2019/0088315 A1 3/2019 Saenz et al.
2019/0088316 A1 3/2019 Inuzuka et al.
2019/0096492 A1 3/2019 Cai et al.
2019/0103147 A1 4/2019 Jones et al.
2019/0130961 A1 5/2019 Bell et al.
2019/0139599 A1 5/2019 Ito et al.
2019/0147941 A1 5/2019 Qin et al.
2019/0147964 A1 5/2019 Yun et al.
2019/0161341 A1 5/2019 Howe
2019/0172518 A1 6/2019 Chen et al.
2019/0172521 A1 6/2019 Morgan
2019/0187745 A1 6/2019 Murali et al.
2019/0196730 A1 6/2019 Imran
2019/0198078 A1 6/2019 Hoang et al.
2019/0198090 A1 6/2019 Lee
2019/0198099 A1 6/2019 Mirichigni et al.
2019/0205253 A1 7/2019 Roberts
2019/0207736 A1 7/2019 Ben-tovim et al.
2019/0228810 A1 7/2019 Jones et al.
2019/0228813 A1 7/2019 Nale et al.
2019/0228815 A1 7/2019 Morohashi et al.
2019/0237131 A1 8/2019 Ito
2019/0237132 A1 8/2019 Morohashi
2019/0243708 A1 8/2019 Cha et al.
2019/0252020 A1 8/2019 Rios et al.
2019/0267077 A1 8/2019 Ito et al.
2019/0279706 A1 9/2019 Kim
2019/0333573 A1 10/2019 Shin et al.
2019/0347019 A1 11/2019 Shin et al.
2019/0348100 A1 11/2019 Smith et al.
2019/0348102 A1 11/2019 Smith et al.
2019/0348103 A1 11/2019 Jeong et al.
2019/0348107 A1 11/2019 Shin et al.
2019/0349545 A1 11/2019 Koh et al.
2019/0362774 A1 11/2019 Kuramori et al.
2019/0371391 A1 12/2019 Cha et al.
2019/0385661 A1 12/2019 Koo et al.
2019/0385667 A1 12/2019 Morohashi et al.
2019/0386557 A1 12/2019 Wang et al.
2020/0005857 A1 1/2020 Ito et al.
2020/0075106 A1 3/2020 Tokutomi et al.
2020/0082873 A1 3/2020 Wolff
2020/0090760 A1 3/2020 Purahmad et al.
2020/0135263 A1 4/2020 Brown et al.
2020/0194050 A1 6/2020 Akamatsu
2020/0194056 A1 6/2020 Sakurai et al.
2020/0201380 A1 6/2020 Murali et al.
2020/0202921 A1 6/2020 Morohashi et al.
2020/0211626 A1 7/2020 Hiscock et al.
2020/0211633 A1 7/2020 Okuma
2020/0211636 A1 7/2020 Hiscock et al.
2020/0251158 A1 8/2020 Shore et al.
2020/0294576 A1 9/2020 Brown et al.
2020/0302994 A1 9/2020 Enomoto et al.
2020/0321049 A1 10/2020 Meier et al.
2020/0333451 A1 10/2020 Wei et al.
2020/0349995 A1 11/2020 Shore et al.
2020/0365208 A1 11/2020 Schreck et al.
2020/0381040 A1 12/2020 Penney et al.
2020/0395072 A1 12/2020 Penney et al.

(56) References Cited

U.S. PATENT DOCUMENTS

| | | | |
|---|---|---|---|
| 2020/0411095 | A1 | 12/2020 | Kim |
| 2021/0005229 | A1 | 1/2021 | Hiscock et al. |
| 2021/0005240 | A1 | 1/2021 | Brown et al. |
| 2021/0020223 | A1* | 1/2021 | Ayyapureddi .... G11C 11/40622 |
| 2021/0020262 | A1 | 1/2021 | Penney et al. |
| 2021/0026732 | A1 | 1/2021 | Park et al. |
| 2021/0057012 | A1 | 2/2021 | Ayyapureddi et al. |
| 2021/0057013 | A1 | 2/2021 | Jenkinson et al. |
| 2021/0057021 | A1 | 2/2021 | Wu et al. |
| 2021/0057022 | A1 | 2/2021 | Jenkinson et al. |
| 2021/0065755 | A1 | 3/2021 | Kim et al. |
| 2021/0065764 | A1 | 3/2021 | Cheng et al. |
| 2021/0142852 | A1 | 5/2021 | Schreck et al. |
| 2021/0158851 | A1 | 5/2021 | Ayyapureddi et al. |
| 2021/0158860 | A1 | 5/2021 | Wu et al. |
| 2021/0158861 | A1 | 5/2021 | Jeong et al. |
| 2021/0201984 | A1 | 7/2021 | Khasawneh et al. |
| 2021/0225432 | A1 | 7/2021 | Enomoto et al. |
| 2021/0241810 | A1 | 8/2021 | Hollis et al. |
| 2021/0265504 | A1 | 8/2021 | Ishizu et al. |
| 2021/0343324 | A1 | 11/2021 | Brown et al. |
| 2021/0350844 | A1 | 11/2021 | Morohashi et al. |
| 2021/0398592 | A1 | 12/2021 | Penney et al. |
| 2021/0407583 | A1 | 12/2021 | Penney et al. |
| 2022/0051716 | A1 | 2/2022 | Ayyapureddi |
| 2022/0068348 | A1 | 3/2022 | Bennett et al. |
| 2022/0069992 | A1 | 3/2022 | Ayyapureddi |
| 2022/0165347 | A1* | 5/2022 | Pan ................... G11C 11/40611 |
| 2022/0230672 | A1 | 7/2022 | Ayyapureddi et al. |
| 2022/0293166 | A1 | 9/2022 | Ayyapureddi et al. |
| 2022/0415427 | A1 | 12/2022 | Pan |
| 2023/0010619 | A1 | 1/2023 | Ayyapureddi et al. |
| 2023/0047007 | A1 | 2/2023 | Lovett |
| 2023/0096256 | A1 | 3/2023 | Sasaki et al. |
| 2023/0170008 | A1 | 6/2023 | Zhang et al. |
| 2023/0205428 | A1 | 6/2023 | Kim et al. |
| 2023/0206980 | A1 | 6/2023 | He et al. |
| 2023/0206989 | A1 | 6/2023 | He et al. |
| 2024/0038292 | A1* | 2/2024 | Kim .................... G11C 11/4085 |
| 2024/0069757 | A1* | 2/2024 | Ko ........................ G06F 3/0623 |
| 2024/0135980 | A1* | 4/2024 | Lee ..................... G06F 12/0223 |
| 2024/0144988 | A1* | 5/2024 | Seo ..................... G11C 11/4091 |
| 2024/0212738 | A1 | 6/2024 | Akamatsu et al. |
| 2024/0427497 | A1 | 12/2024 | Lu |
| 2025/0124963 | A1 | 4/2025 | Lu |
| 2025/0124964 | A1 | 4/2025 | Lu et al. |
| 2025/0131972 | A1 | 4/2025 | Pan |
| 2026/0024571 | A1 | 1/2026 | Ayyapureddi et al. |

FOREIGN PATENT DOCUMENTS

| | | | |
|---|---|---|---|
| CN | 1371100 | A | 9/2002 |
| CN | 101038785 | A | 9/2007 |
| CN | 101067972 | A | 11/2007 |
| CN | 101331554 | A | 12/2008 |
| CN | 101346775 | A | 1/2009 |
| CN | 101458658 | A | 6/2009 |
| CN | 101595528 | A | 12/2009 |
| CN | 101622607 | A | 1/2010 |
| CN | 102074268 | A | 5/2011 |
| CN | 102113058 | A | 6/2011 |
| CN | 102364991 | A | 2/2012 |
| CN | 102467976 | A | 5/2012 |
| CN | 102483952 | A | 5/2012 |
| CN | 103366808 | A | 10/2013 |
| CN | 103544987 | A | 1/2014 |
| CN | 103928048 | A | 7/2014 |
| CN | 104183264 | A | 12/2014 |
| CN | 104350546 | A | 2/2015 |
| CN | 104462011 | A | 3/2015 |
| CN | 105493188 | A | 4/2016 |
| CN | 105814636 | A | 7/2016 |
| CN | 106710621 | A | 5/2017 |
| CN | 107256717 | A | 10/2017 |
| CN | 107871516 | A | 4/2018 |
| CN | 108122581 | A | 6/2018 |
| CN | 108154895 | A | 6/2018 |
| CN | 109074305 | A | 12/2018 |
| CN | 109285576 | A | 1/2019 |
| CN | 109408898 | A | 3/2019 |
| CN | 110827884 | A | 2/2020 |
| CN | 111247586 | A | 6/2020 |
| CN | 112185443 | A | 1/2021 |
| CN | 113330518 | A | 8/2021 |
| CN | 113544779 | A | 10/2021 |
| CN | 109074305 | B | 7/2023 |
| EP | 2549482 | A1 | 1/2013 |
| JP | H03164866 | A | 7/1991 |
| JP | H0773682 | A | 3/1995 |
| JP | H10241385 | A | 9/1998 |
| JP | 2005-216429 | A | 8/2005 |
| JP | 2011-258259 | A | 12/2011 |
| JP | 4911510 | B2 | 1/2012 |
| JP | 2012190506 | A | 10/2012 |
| JP | 2013-004158 | A | 1/2013 |
| KR | 20140112164 | A | 9/2014 |
| KR | 20150002112 | A | 1/2015 |
| KR | 20150002783 | A | 1/2015 |
| KR | 20170058022 | A | 5/2017 |
| KR | 20180064940 | A | 6/2018 |
| KR | 1020180064940 | A | 6/2018 |
| KR | 1020180085184 | A | 7/2018 |
| KR | 20190048049 | A | 5/2019 |
| KR | 20190102580 | A | 9/2019 |
| WO | 2014120477 | A1 | 8/2014 |
| WO | 2015030991 | A1 | 3/2015 |
| WO | 2017171927 | A1 | 10/2017 |
| WO | 2018217582 | A2 | 11/2018 |
| WO | 2019222960 | A1 | 11/2019 |
| WO | 2020010010 | A1 | 1/2020 |
| WO | 2020191222 | A1 | 9/2020 |
| WO | 2021003085 | A1 | 1/2021 |
| WO | 2022108808 | A1 | 5/2022 |

OTHER PUBLICATIONS

U.S. Appl. No. 18/744,988 titled “Apparatuses and Methods for Per-Row Count Based Refresh Target Identification With Sorting” filed Jun. 17, 2024, pp. all pages of the application as filed.

U.S. Appl. No. 18/745,068 titled “Apparatuses and Methods for Per Row Activation Counter Testing” filed Jun. 17, 2024, pp. all pages of the application as filed.

Kim , et al. “Flipping Bits in Memory Without Accessing Them: An Experimental Study of DRAM Disturbance Errors” , IEEE, Jun. 2014; pp. all.

Stout, Thomas , et al. “Voltage Source Based Voltage-to-Time Converter”, IEEE, downloaded Jul. 2020, pp. all.

Zheng, Bin , et al. “Design of Built-in DRAM for TFT-LCD Driver Chip “LCD and display,” Issue 4”, Aug. 15, 2009; pp. all.

U.S. Appl. No. 19/292,661 titled “Apparatuses and Methods for Dynamically Allocated Aggressor Detection” filed Aug. 6, 2025, pp. all pages of the application as filed.

* cited by examiner

APPARATUSES AND METHODS FOR PER-ROW COUNT BASED REFRESH TARGET IDENTIFICATION

CROSS REFERENCE TO RELATED APPLICATION(S)

This application claims the benefit under 35 U.S.C. § 119 of the earlier filing date of U.S. Provisional Application Ser. No. 63/578,596 filed Aug. 24, 2024 the entire contents of which are hereby incorporated by reference in its entirety for any purpose.

BACKGROUND

Information may be stored on memory cells of a memory device. The memory cells may be organized at the intersection of word lines (rows) and bit lines (columns). Information in the memory cells may decay over time. For example, the information may be stored as a charge on a capacitor which may decay over time. The memory device may perform refresh operations to restore the information and prevent information from being lost.

Certain patterns of access may cause an increased rate of information decay in nearby memory cells (e.g., the memory cells along nearby word lines). Memories may use various schemes to identify which memory cells are affected by such patterns such that targeted refresh operations can be performed before those memory cells lose their information. There is need to balance the targeted refresh operations with the time and power they use.

DETAILED DESCRIPTION

Figure 1:
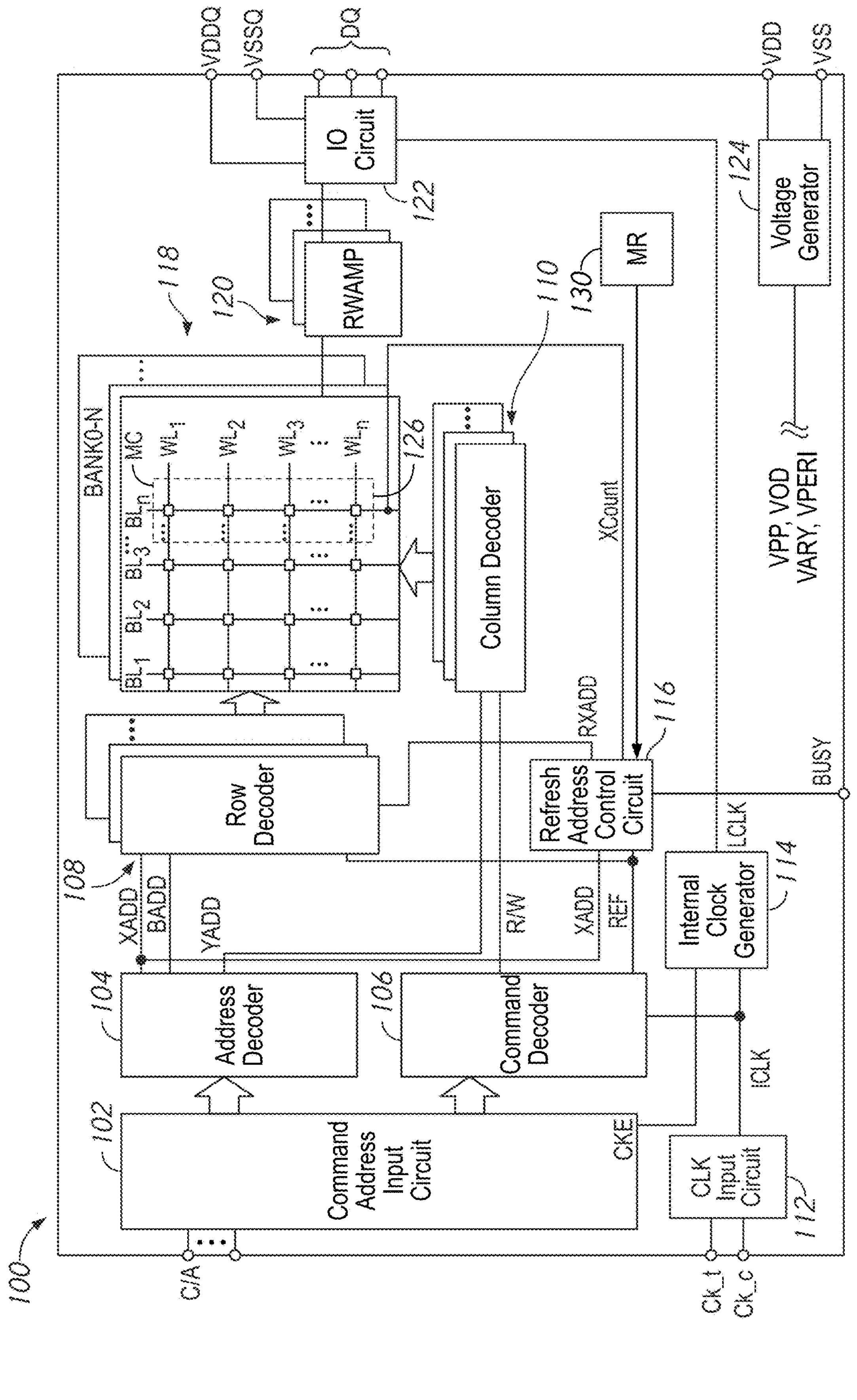
FIG. 1 is a block diagram of a semiconductor device according to an embodiment of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Information in a memory array may be accessed by one or more access operations, such as read or write operations. During an example access operation a word line may be activated based on a row address and then selected memory cells along that active word line may have their information read or written to based on which bit lines are accessed, which may be based on a column address. The memory array may be refreshed on a row by row basis (e.g., as part of an auto-refresh and/or self-refresh mode) where the memory cells along each row are refreshed periodically. The speed at which the rows are refreshed (e.g., the maximum time any given row will go between refreshes) may be determined based on an expected rate of information decay.

Various patterns of access to a row (an aggressor row) may cause an increased rate of information decay in nearby memory cells (e.g., along victim rows). For example, a 'row hammer' may involve repeated accesses to the aggressor row which may increase a rate of decay in adjacent rows (and/or in rows which are further away). Accordingly, it may be important to track a number of accesses to each row to determine if they are aggressors, such that the victim rows can be identified and refreshed as part of a targeted refresh operation. For example, each word line may have an associated count value which is used to determine how many times that word line has been accessed. Based on those access counts, rows may be identified for targeted refresh operations. There may be a need to manage how the memory identifies rows to balance detecting rows so they can be refreshed before information is lost against the time and power that those targeted refresh operations use. There may be a need to ensure that potential aggressors are identified while filtering out un-needed targeted refresh operations.

The present disclosure is drawn to apparatuses, systems, and methods for per-row count based refresh target identification. A memory device includes a number of word lines, each of which stores a count value. A refresh control circuit of the memory device identifies the rows with the N highest count values and stores the row address and count value in a register. For example, in an example embodiment where N is 1, the row and count value with the highest count value is stored. In an embodiment where N is 2, the two rows and their count values with the highest and next highest count value are stored. When a targeted refresh operation is called for, the stored row with the worst count value is compared to a threshold. If the count value has crossed the threshold, a targeted refresh operation is performed on victims associated with the address and the count is reset. If the count value has not crossed the threshold, then the targeted refresh operation may be skipped.

FIG. 1 is a block diagram of a semiconductor device according to at least one embodiment of the disclosure. The semiconductor device 100 may be a semiconductor memory device, such as a DRAM device integrated on a single semiconductor chip.

The semiconductor device 100 includes a memory array 118. The memory array 118 is shown as including a plurality of memory banks. In the embodiment of FIG. 1, the memory array 118 is shown as including eight memory banks BANK0-BANK7. More or fewer banks may be included in the memory array 118 of other embodiments. Each memory bank includes a plurality of word lines WL (rows), a plurality of bit lines BL (columns), and a plurality of memory cells MC arranged at intersections of the plurality of word lines WL and the plurality of bit lines BL.

The selection of the word line WL is performed by a row decoder 108 and the selection of the bit lines BL is performed by a column decoder 110. In the embodiment of FIG. 1, the row decoder 108 includes a respective row decoder for each memory bank and the column decoder 110 includes a respective column decoder for each memory bank. The bit lines BL are coupled to a respective sense amplifier (SAMP). Read data from the bit line BL is amplified by the sense amplifier SAMP, and transferred to read/write amplifiers 120 over complementary local data lines (LIOT/B), transfer gate (TG), and complementary main data lines (MIOT/B). Conversely, write data outputted from the read/write amplifiers 120 is transferred to the sense amplifier SAMP over the complementary main data lines MIOT/B, the transfer gate TG, and the complementary local data lines LIOT/B, and written in the memory cell MC coupled to the bit line BL.

Some of the memory cells may be set aside as counter memory cells 126. The counter memory cells may store count values XCount, each of which is associated with one of the word lines. Each count value XCount may be stored in counter memory cells 126 along the word line that the count value is associated with. The count value XCount may be stored as a binary number, with each bit stored in a memory cell along the word line. For the sake of clarity, a single bit line of counter memory cells 126 is shown in FIG. 1. The number of counter memory cells along each word line may be based on a number of bits of the count value XCount. In some embodiments, extra counter memory cells (e.g., more than the length of the number XCount) may be used, for example to store error correction information for the count value XCount.

The counter memory cells 126 may be referred to as such due to their use (storing the count values) and in some embodiments may be structurally similar to, or identical to, the other memory cells of the array. In some embodiments, the counter memory cells 126 may be grouped together (e.g., at the end of the word line). Other distributions of the counter memory cells 126 along the word line may be used in other example embodiments. In some embodiments, the counter memory cells 126 may not be directly accessible by external devices such as controllers (e.g., to prevent the count values from being overwritten). In other words, the bit lines associated with the counter memory cells 126 may not be accessed by a normal column address.

The semiconductor device 100 may employ a plurality of external terminals that include command and address (C/A) terminals coupled to a command and address bus to receive commands and addresses, and a CS signal, clock terminals to receive clocks CK and/CK, data terminals DQ to provide data, and power supply terminals to receive power supply potentials VDD, VSS, VDDQ, and VSSQ.

The clock terminals are supplied with external clocks CK and/CK that are provided to an input circuit 112. The external clocks may be complementary. The input circuit 112 generates an internal clock ICLK based on the CK and/CK clocks. The ICLK clock is provided to the command decoder 110 and to an internal clock generator 114. The internal clock generator 114 provides various internal clocks LCLK based on the ICLK clock. The LCLK clocks may be used for timing operation of various internal circuits. The internal data clocks LCLK are provided to the input/output circuit 122 to time operation of circuits included in the input/output circuit 122, for example, to data receivers to time the receipt of write data.

The C/A terminals may be supplied with memory addresses. The memory addresses supplied to the C/A terminals are transferred, via a command/address input circuit 102, to an address decoder 104. The address decoder 104 receives the address and supplies a decoded row address XADD to the row decoder 108 and supplies a decoded column address YADD to the column decoder 110. The address decoder 104 may also supply a decoded bank address BADD, which may indicate the bank of the memory array 118 containing the decoded row address XADD and column address YADD. The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 102. The command decoder 106 includes circuits to decode the internal command signals to generate various internal signals and commands for performing operations. For example, the command decoder 106 may provide a row command signal to select a word line and a column command signal to select a bit line.

The device 100 may receive an access command which is a row activation command ACT. When the row activation command ACT is received, a bank address BADD and a row address XADD are timely supplied with the row activation command ACT.

The device 100 may receive an access command which is a read command. When a read command is received, a bank address BADD and a column address YADD are timely supplied with the read command, read data is read from memory cells in the memory array 118 corresponding to the row address XADD and column address YADD. The read command is received by the command decoder 106, which provides internal commands so that read data from the memory array 118 is provided to the read/write amplifiers 120. The read data is output to outside from the data terminals DQ via the input/output circuit 122. The access count XCount stored counter memory cells 126 of the row associated with the row address XADD are read to the refresh address control circuit 116, and an updated value of the access count XCount' is written back to the counter memory cells 126 of the row XADD.

The device 100 may receive an access command which is a write command. When the write command is received, a bank address BADD and a column address YADD are timely supplied with the write command, write data supplied to the data terminals DQ is written to a memory cells in the memory array 118 corresponding to the row address and column address. The write command is received by the command decoder 106, which provides internal commands so that the write data is received by data receivers in the input/output circuit 122. Write clocks may also be provided to the external clock terminals for timing the receipt of the write data by the data receivers of the input/output circuit 122. The write data is supplied via the input/output circuit 122 to the read/write amplifiers 120, and by the read/write amplifiers 120 to the memory array 118 to be written into the memory cell MC. Similar to the read operation described above, the access count Xcount stored in counter memory cells 126 of the row associated with the row address XADD are read to the refresh address control circuit 116, and an updated value of the access count Xcount' is written back to the counter memory cells 126 of the row XADD.

The device 100 may also receive commands causing it to carry out refresh operations. For example, a controller of the memory may put the device 100 into an auto-refresh mode and provide refresh signal REF. The device 100 may also enter a self-refresh mode where the refresh signal is generated internally. Since other than the source of the refresh signal, the two operations may generally be similar, the present disclosure will generally describe auto-refresh operations (for example the refresh signal may be referred to as an 'auto-refresh signal'). However, it should be understood that the present disclosure may apply to self-refresh (or other refresh modes) as well.

The refresh signal REF may be a pulse signal which is activated when the command decoder 106 receives a signal which indicates an auto-refresh command. In some embodiments, the auto-refresh command may be externally issued to the memory device 100. In some embodiments, the auto-refresh command may be periodically generated by a component of the device (e.g., as part of a self-refresh mode). In some embodiments, when an external signal indicates a self-refresh entry command, the refresh signal REF may also be activated. The refresh signal REF may be activated once immediately after command input, and thereafter may be cyclically activated at desired internal timing. Thus, refresh operations may continue automatically. A self-refresh exit command may cause the automatic activation of the refresh signal REF to stop and return to an IDLE state.

The refresh signal REF is supplied to the refresh address control circuit 116. The refresh address control circuit 116 supplies a refresh row address RXADD to the row decoder 108, which refreshes a wordline WL identified by the refresh row address RXADD. The refresh address control circuit 116 controls a type of refresh operation with timing based on the refresh signal REF, and generates and provides the refresh address RXADD. The refresh address control circuit 116 may be controlled to change details of the refreshing address RXADD (e.g., how the refresh address is calculated, the timing of the refresh addresses), or may operate based on internal logic.

The refresh address control circuit 116 may selectively output a targeted refresh address (e.g., a victim address) or a sequential refresh address (e.g., an auto-refresh address) as the refreshing address RXADD. The sequential refresh addresses may be generated based on a sequence of addresses. For example, each sequential refresh may be based on a previous sequential refresh address (e.g., RXADD (i)=RXADD (i−1)+1). The refresh address control circuit 116 may cycle through the sequence of sequential addresses at a rate determined by REF. In some embodiments, the sequence of sequential addresses may include all the addresses in the memory bank 118. In some embodiments, the auto-refresh signal REF may be issued with a frequency such that most or all of the addresses in the memory bank 118 are refreshed within a certain period (e.g., such that there is a maximum specified time between two consecutive sequential refreshes of a given word line), which may be based on an expected rate at which information in the memory cells MC decays.

The refresh address control circuit 116 also performs targeted refresh operations. As part of a targeted refresh operation the refresh address control circuit generates one or more refresh addresses based on an identified aggressor address. The aggressor addresses are row addresses identified as aggressors based on the count value XCount associated with that address. The refresh address control circuit 116 stores one or more candidate addresses and their associated counts in a candidate register. When a row is accessed, the count value XCount is read out and updated (e.g., by being incremented). The updated count value is compared to the stored count values in the candidate register. If the updated count value is greater, it is stored in the register and the current row address is written to the register (overwriting a previous entry). In this manner, the candidate register stores the addresses and counts with the highest count values. The depth of the register may determine how many addresses and counts are stored.

Refresh operations are performed with a timing based on a timing of the refresh signal REF or based on an RFM command. Responsive to REF, the refresh address control circuit may perform multiple 'pumps' of an internal refresh signal, and a refresh operation may be performed for each of those pumps. Each pump may be used for a sequential refresh operation, a targeted refresh operation, or may be skipped (e.g., no refresh operation performed). In some embodiments, the targeted refresh address may be issued in (e.g., "steal") a pump which would otherwise have been used for a sequential refresh operation. In some embodiments, certain time slots may be reserved for targeted refresh addresses. Responsive to an RFM command, the refresh control circuit 116 may perform multiple pumps, all of which may be used for targeted refresh operations.

When a targeted refresh operation is called for, either by the internal logic of the refresh control circuit 116 or due to an external command such as a refresh management (RFM) command, the refresh control circuit 116 may determine if the stored address in the candidate register is an aggressor. For example, the stored count value may be compared to a threshold and if the count has crossed the threshold (e.g., is greater than the threshold), then the stored address may be identified as an aggressor, and one or more targeted refresh addresses may be generated based on the aggressor. Responsive to the targeted refresh operation being performed, the count value XCount in the counter memory cells 126 associated with the identified aggressor may be changed, such as being reset (e.g., to an initial value such as 0). If the stored count value had not crossed the threshold, then the stored address is not an aggressor and the targeted refresh operation may be skipped.

The threshold may be a setting of the memory device 100 in some embodiments. For example, a mode register 130 may store the threshold value. The mode register 130 may store a collection of registers, each of which store settings and/or information about the memory device. Some registers may be modified by a controller (e.g., to change settings) via mode register write operation. Some registers may be set by a non-volatile storage element on the memory, such as a fuse array. The controller may perform mode register read operations to determine the state of selected registers. An aggressor threshold register may set a value of the threshold. If the threshold is increased, fewer targeted refresh operations will occur and if it is decreased, more will occur. If the threshold is set to 0, then a targeted refresh will always be performed when a targeted refresh is called for.

The refresh address control circuit 116 may use different methods to calculate a targeted refresh address based on the aggressor address based on the access count. For example the victim addresses may include word lines adjacent to the aggressor word line (e.g., XADD+1 and XADD−1) and/or may include wordlines further away (e.g., XADD+/−2, XADD+/−3, etc.). In some embodiments, more than one victim address may correspond to a given aggressor address. In this case the refresh address control circuit may queue up multiple targeted refresh addresses, and provide them sequentially when it determines that a targeted refresh address should be provided. The refresh address control circuit 116 may provide the targeted refresh address right away, or may queue up the targeted refresh address to be provided at a later time (e.g., in the next time slot available for a targeted refresh).

The power supply terminals are supplied with power supply potentials VDD and VSS. The power supply potentials VDD and VSS are supplied to an internal voltage generator circuit 124. The internal voltage generator circuit 124 generates various internal potentials VPP, VARY, VPERI, and the like based on the power supply potentials VDD and VSS supplied to the power supply terminals. The internal potential VPP is mainly used in the row decoder 108, the internal potentials VARY are mainly used in the sense amplifiers SAMP included in the memory array 118, and the internal potential VPERI is used in many peripheral circuit blocks.

The power supply terminals are also supplied with power supply potentials VDDQ and VSSQ. The power supply potentials VDDQ and VSSQ are supplied to the input/output circuit 122. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 2:
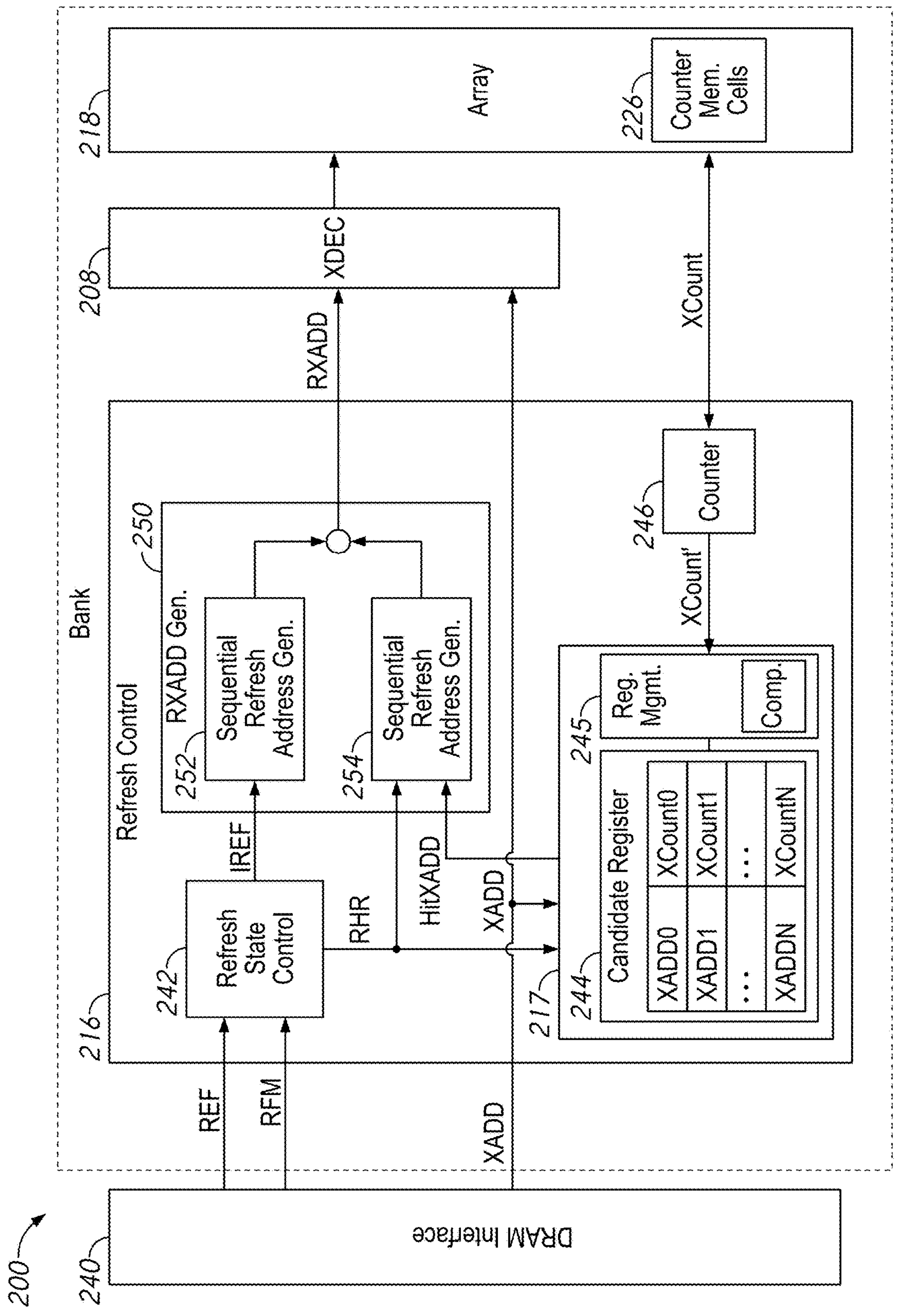
FIG. 2 is a block diagram of a refresh control circuit according to an embodiment of the present disclosure.

FIG. 2 is a block diagram of a refresh control circuit according to an embodiment of the present disclosure. FIG. 2 may show an example layout of portions of a memory 200 which may implement a portion of a memory device, such as the memory device 100 of FIG. 1. For example, the memory array 218 may implement the memory array 118 of FIG. 1, the row decoder 208 may implement the row decoder 108 of FIG. 1, the refresh control circuit 216 may implement the refresh control circuit 116 of FIG. 1 and so forth.

Certain internal components and signals of the refresh address control circuit 216 are shown to illustrate the operation of the refresh address control circuit 216. For example, the refresh control circuit 216 may include an RHR state control circuit 242 which determines if sequential or targeted refreshes are performed, an aggressor detector circuit 217 which identifies addresses as aggressors HitXADD, and a refresh address generator 250 which generates the refresh address RXADD. Also shown is a counter circuit 246 which manages the values of XCount stored in the counter memory cells 226 of the memory array 218.

The dotted line around the refresh address control circuit 216, the row decoder 208, and the memory array 218 is shown to represent that in certain embodiments, each of the components within the dotted line may correspond to a particular bank of memory, and that these components may be repeated for each of the banks of memory. In some embodiments, the components shown within the dotted line may be associated with each of the memory banks. Thus, there may be multiple refresh address control circuits 216 and row decoders 208. For the sake of brevity, components for only a single bank will be described.

FIG. 2 shows components, such as the counter 246, aggressor detector 217, refresh state control circuit 242 and refresh address generator 250, grouped together as part of the refresh control circuit 216. However, one or more of these components may be spatially distributed throughout the memory. For example, the aggressor detector circuit 217 and the counter circuit 248 may be spatially located in a logic region closer to the bank while the other components of the refresh control circuit may be in a bank logic region. Other distributions may be used in other example embodiments.

A DRAM interface 240 may provide one or more signals to an address refresh control circuit 216 and row decoder 208 which in turn (along with a column decoder, not shown) may perform access operation on a memory array 218. When a row of the memory array 218 is accessed, the values of the counter memory cells 226 along that row are read to the counter circuit 246. For example, the counter memory cells 226 may store the bits of a binary number that represents the count value. For example, if the number is a 16-bit number, then 16 or more counter memory cells may store the bits of the number.

The counter 246 may determine a value of the access count for that row based on the values read from the counter memory cells 226. The counter 246 may be a count control circuit, which may manage a value of the count stored in the counter memory cells 226 (e.g., by reading the raw data in the counter memory cells 226 as a numerical value, writing new numerical values to the counter memory cells 226 etc.). The counter circuit 246 may change the count value (e.g., by incrementing the count value) write the changed count value back to the counter memory cells and provide the changed count value to the aggressor detector circuit 217. The aggressor detector circuit 217 includes an aggressor candidate register 244 and a register management circuit 245. The candidate register 244 stores a set of candidate row addresses and their associated count values. During an access operation, the register management circuit 245 compares the accessed row address XADD and its updated count value XCount' to the stored addresses. If the address XADD matches, then its count value in the register 244 is updated to XCount'. If there is not a match, the count value is stored and the address is stored if the count value is greater than one of the stored count values, with the row address XADD and count XCount' replacing a previous entry with the lowest count value.

During refresh operations (e.g., responsive to REF and/or RFM) the refresh state controller 242 determines a type of refresh operation and provides internal refresh signals IREF and/or RHR. The signal RHR indicates that a targeted refresh operation should be performed. Responsive to RHR, the aggressor detector circuit 217 compares the stored value XCount with the highest value to a threshold. If the value crosses the threshold, then the row address associated with that count is identified as an aggressor HitXADD and provided to a refresh address generator 250, which generates one or more refresh addresses RXADD based on the aggressor HitXADD. The row decoder 208 then performs a refresh operation on the word line indicated by RXADD. An additional operation is performed to have the counter 246 read out of the count value XCount associated with the aggressor HitXADD from the counter memory cells 226 and reset that count (e.g., to an initial value such as 0).

The DRAM interface 240 may represent one or more components which provides signals to components of the bank. For example, the DRAM interface 240 may represent components such as the command address input circuit 102, the address decoder 104, and/or the command decoder 106 of FIG. 1. The DRAM interface 240 may provide a row address XADD, the auto-refresh signal REF and various other signals not shown in FIG. 2, such as row activation signals ACT and pre-charge signals Pre. The auto-refresh signal REF may be a periodic signal which may indicate when an auto-refresh operation is to occur. The row address XADD may be a signal which specifies one or more particular wordlines of the memory array 218, and may be a signal including multiple bits (which may be transmitted in series or in parallel). The DRAM interface 240 may also provide a refresh management command RFM, which is received from a controller of the memory.

The aggressor detection circuit 217 includes a candidate register 244 which stores a set of candidate addresses and their associated count values. The candidate register 244 includes a number of slots, each of which stores an address and count value. The number of slots determines how many addresses and count values can be stored. The candidate register 244 stores the addresses with the highest count values. During access operations, the aggressor detection circuit 217 receives row address XADD and their associated updated count value XCount from the counter circuit 246. A register management circuit 245 includes a comparator circuit 248 which compares the updated count value to the stored count values. If the updated count value is greater, then the row address XADD and updated count value XCount' overwrite the stored address and count value. In some embodiments, the new row and count may overwrite the stored address with the lowest count value.

The refresh state controller 242 may receive the auto-refresh signal REF and determine what type and how many refresh operations should occur. The refresh state control circuit 242 provides one or more activations of internal refresh signals IREF and RHR. Responsive to the activations of the internal refresh signals, the refresh address generator performs a refresh operation (or skips performing a refresh operation if the aggressor detector does not identify an aggressor HitXADD). The refresh state controller 242 provides the signal RHR to indicate a targeted refresh operation. The refresh state controller 242 provides the signal RHR responsive to RFM or based on internal logic responsive to REF. For example, the refresh state controller 242 may provide the RHR signal based on certain number of activations of REF (e.g., every $4^{th}$ activation of REF) and/or based on a number of activations of IREF. In some embodiments, IREF alone may indicate a sequential refresh operation, while IREF and RHR together indicate a targeted refresh operation. Responsive to REF or RFM, the refresh state control may generate a number of activations of IREF (e.g., a number of pumps) and then activate RHR for the pumps which are used for targeted refresh operation.

Responsive to the signal RHR, the aggressor detector 217 determines if the stored address with the highest count value is an aggressor or not, and if so provides it as the aggressor address HitXADD. Responsive to no address in the candidate register 244 being an aggressor, no address is provided as HitXADD (which in turn causes the targeted refresh operations to be skipped). The aggressor detector circuit 217 determines if the address with the highest count value is an aggressor by comparing the count value to a threshold (e.g., with comparator circuit 248). If the count value has not crossed the threshold (e.g., is below the threshold) then the address is not an aggressor and no address is provided as HitXADD. If the address has crossed the threshold (e.g., meets or exceeds the threshold) then address is provided as HitXADD.

Responsive to one of the stored addresses being provided as HitXADD, the register management circuit 245 may perform an operation to reset the count value associated with that address. The register management circuit 245 may direct the row decoder 208 to read out the count value associated with HitXADD from the counter memory cells 226 to the counter circuit 246. The register management circuit 245 may direct the counter circuit 246 to reset the count value (e.g., to an initial value) and write the reset value back to the counter memory cells 226. The register management circuit 245 also removes the stored address and count value from the register 244.

The refresh address generator 250 includes a sequential refresh address generator 252 and a targeted refresh address generator 254. The sequential refresh address generator 252 generates a sequential refresh address as the refresh address RXADD when a sequential refresh operation is called for (e.g., when IREF is active but RHR is not). The sequential refresh address may be based on a previous sequential refresh address. For example, the sequential refresh address generator may have a counter circuit which increments a previous sequential refresh address value to achieve the next sequential refresh address.

The refresh address generator circuit 250 also includes a targeted refresh address generator circuit 254 which generates a targeted refresh address as the refresh address RXADD when it receives the RHR signal and an identified aggressor address HitXADD. If the signal RHR is provided, but HitXADD is not (e.g., because none of the addresses stored in the candidate register 244 have crossed the threshold) then the targeted refresh address generator may skip the targeted refresh operation by not providing a refresh address RXADD. The targeted refresh address generator 254 may determine the locations of one or more victim rows based on aggressor address HitXADD and provide them as the refresh address RXADD. In some embodiments, the victim rows may include rows which are physically adjacent to the aggressor row (e.g., HitXADD+1 and HitXADD−1). In some embodiments, the victim rows may also include rows which are physically adjacent to the physically adjacent rows of the aggressor row (e.g., HitXADD+2 and HitXADD−2). Other relationships between victim rows and the identified aggressor rows may be used in other examples.

The row decoder 208 may perform one or more operations on the memory array 218 based on the received signals and addresses. For example, responsive to the activation signal ACT and the row address XADD (and IREF and RHR being at a low logic level), the row decoder 208 may direct one or more access operations (for example, a read operation) on the specified row address XADD. Responsive to an address RXADD and one or both of the signals IREF and RHR being active, the row decoder 208 may perform a refresh operation on the word line (or word lines) associated with RXADD. Responsive to the signal RHR being active but no address RXADD (e.g., because no address HitXADD was provided to the refresh address generator 250) then the row decoder 208 may skip the refresh operation.

Figure 3:
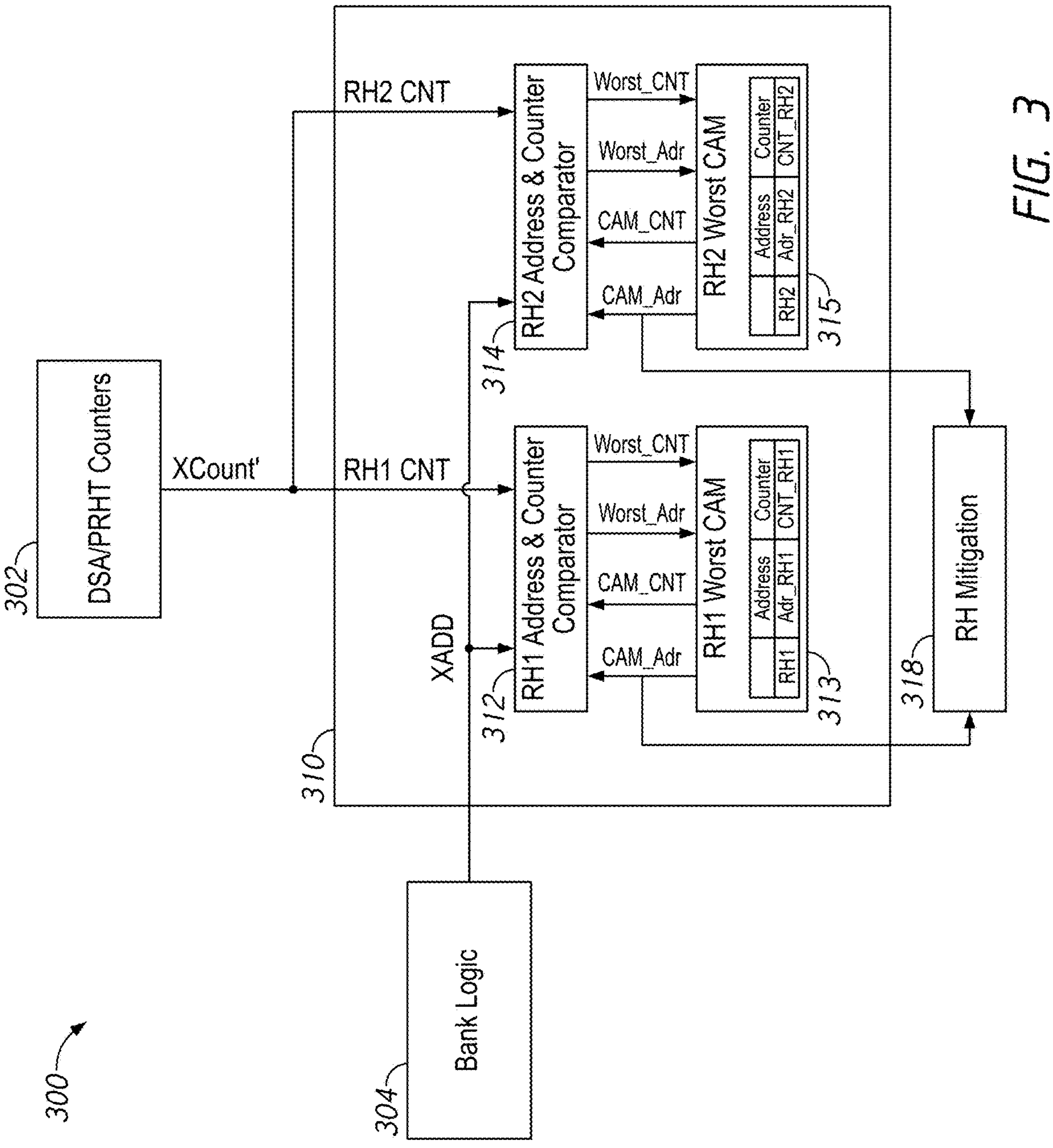
FIG. 3 is a block diagram of an aggressor detector circuit according to some embodiments of the present disclosure.

FIG. 3 is a block diagram of an aggressor detector circuit according to some embodiments of the present disclosure. FIG. 3 shows portions of a memory 300 such as the memory 100 of FIGS. 1 and/or 200 of FIG. 2. The aggressor detector circuit 310 may, in some embodiments, implement the aggressor detector circuit 217 of FIG. 2. In the embodiment of FIG. 3, the candidate register (e.g., 244 of FIG. 2) is split into two registers 313 and 315, each of which stores a single address (e.g., has a depth of one). Other depths for one or both registers 313 and/or 315 may be used in other example embodiments. Each of the registers 313 and 315 has an associated portion 312 and 314 respectively of a register management circuit (e.g., 245 of FIG. 2). The two registers may be used to store candidate addresses for two different types of targeted refresh operation (e.g., for refreshing +/−1 victims or +/−2 victims). Also shown in FIG. 3 are a counter circuit 302 (e.g., 246 of FIG. 2) and bank logic 304, which represents various other components of the refresh control circuit (e.g., the refresh state control 242 of FIG. 2, DRAM interface 240, refresh address generator 250, and/or row decoder 208 of FIG. 2).

Each of the registers 313 and 315 has a single slot which stores a single address and its related count value. The registers may include a number of content addressable memory (CAM) cells which allow comparing an input to the stored value. The register management circuits 312 and 314 can each read out of the stored address CAM_Adr and stored count CAM_CNT from their respective registers 313 and 315, and also write an address Worst_Adr and count Worst_CNT to their respective registers.

During an access operation, the bank logic 304 provides a row address XADD along with an activation signal ACT to the memory array such as 118 of FIGS. 1 and/or 218 of FIG. 2 (not shown in FIG. 3). Responsive to the signal ACT, the word line associated with the value of XADD is activated, and the bits stored in the counter memory cells (e.g., 126 of FIGS. 1 and/or 226 of FIG. 2) are read out to the counter circuit 302. The counter circuit 302 updates the count value (e.g., by incrementing it) and provides the updated count value XCount' to the aggressor detector circuit 310.

Both portions of the register management circuit 312 and 314 receive the row address XADD from a row address bus and the updated count value XCount' from the counter. The count goes to the first register management portion 312 as RH1 CNT and to the second register management portion 314 as RH2 CNT. The register management portion 312 compares the count RH1 CNT to the stored CAM_CNT from the first register slot 312 and the register management portion 314 compares the count RH2 CNT to the stored CAM_CNT from the second register slot 315. If the count value RH1 CNT is greater than the value CAM_CNT read out from the register 313, then the register management circuit 312 provides XADD and RH1 CNT as the Worst_Adr and Worst_CNT, to overwrite the values stored in the register 313. Similarly, if the count value RH2 CNT is greater than the value CAM_CNT read out from the register 315, then the register management circuit 314 provides XADD and RH2 CNT as the Worst_Adr and Worst_CNT, to overwrite the values stored in the register 315.

During refresh operations, a first type or a second type of targeted refresh operation may be called for. The first type of targeted refresh operation may refresh word lines which have a first relationship with the identified aggressor, while the second type of targeted refresh operation may refresh word lines which have a second relationship with the identified aggressor. For example, the first type of targeted refresh operation may refresh word lines which are adjacent to the aggressor (e.g., +/−1) while the second type of targeted refresh operation may refresh word lines which are further away (e.g., +/−2). When the bank logic 304 calls for the first type of targeted refresh operation, the first refresh management portion 312 and register 313 may be used. When the bank logic calls for the second type of targeted refresh operation, the second refresh management portion 314 and register 315 may be used.

The bank logic 304 may call for the different types of targeted refresh operation based on internal logic For example, every Nth time the first type of targeted refresh operation is performed, the second type of targeted refresh operation may be performed as the next targeted refresh operation. Based on which type of targeted refresh operation is called for, the row hammer mitigation logic circuit 318 may use different logic to generate the refresh address RXADD.

Figure 4:
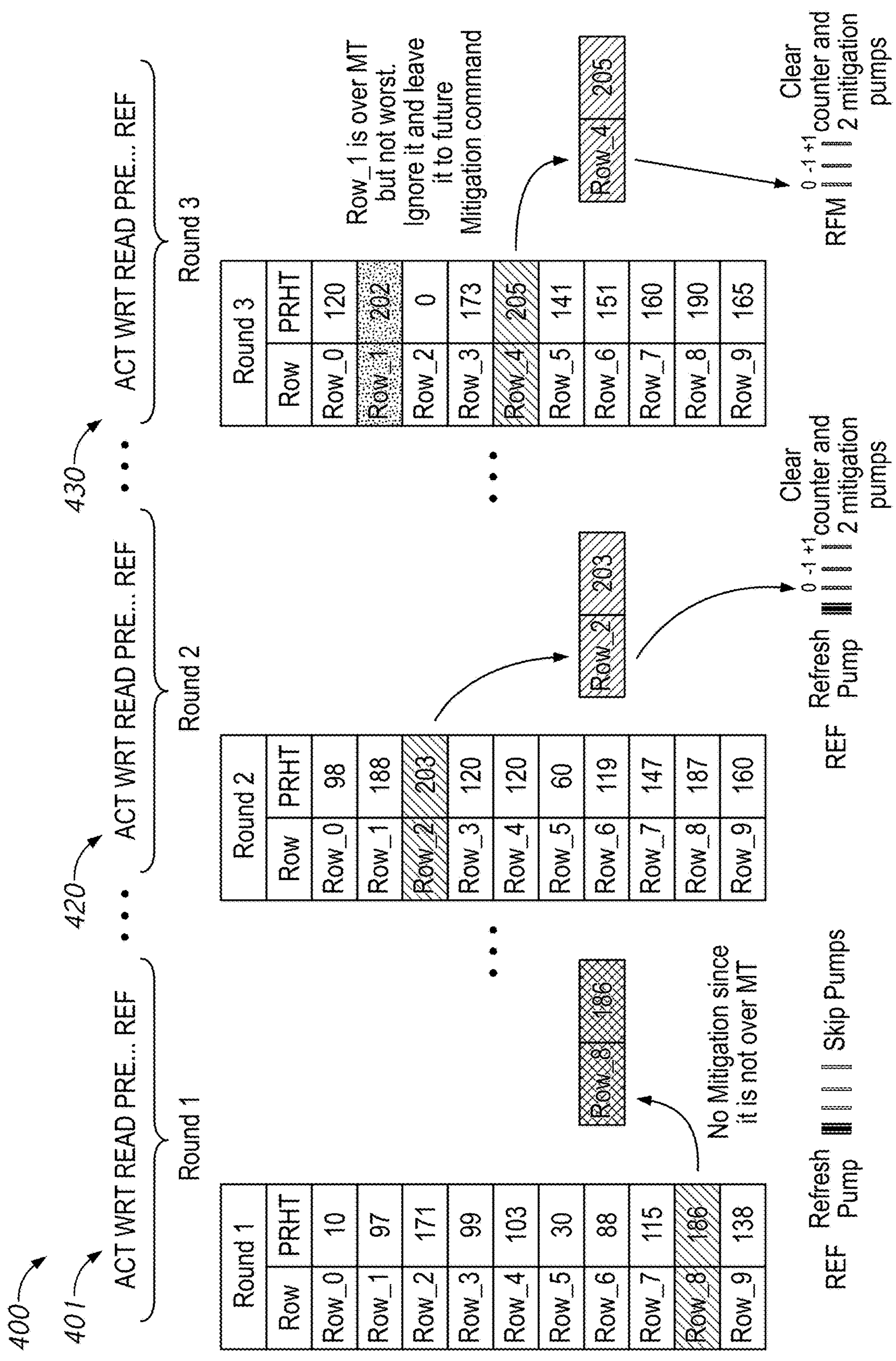
FIG. 4 is a timing diagram of refresh operations in a memory according to some embodiments of the present disclosure.

FIG. 4 is a timing diagram of refresh operations in a memory according to some embodiments of the present disclosure. The timing diagram 400 may, in some embodiments, be implemented by one or more of the apparatuses and systems discussed herein, such as the memory device 100 of FIG. 1, 200 of FIGS. 2 and/or 300 of FIG. 3. In the example embodiment of FIG. 4, a total of 10 example rows are shown, and the aggressor threshold is set to 200. However, these are example values for the sake of explanation, and other values may be used in other example embodiments.

The timing diagram shows 3 'rounds' 410-430 of commands, each of which ends with a refresh command REF. The top line of each round shows a portion of an example sequence of commands which could be sent as part of the round, such as row activation commands ACT, precharge commands PRE, and write and read commands WRT and READ, as well as the refresh commands REF and RFM. Each round 410-430 also shows a table which represents a set of row addresses and their associated count values at the end of that round when the refresh command is received. Each round also shows a set of refresh pumps (e.g., activations of IREF and/or RHR) generated responsive to the refresh signal or the RFM command and how those pumps may be used.

At the end of the first round 410, the row address with the highest access count is Row_8 with a count of 186. However, this is below the aggressor threshold. Accordingly, responsive to the refresh signal REF, a set of pumps are generated, a first set of which is used for sequential refresh operations, but the last three of which are skipped.

At the end of the second round 420, the row with the highest count is now Row_2, with a count of 203. Since this is above the threshold value, responsive to the refresh signal REF, after the sequential refresh pumps are performed, three targeted refresh pumps are performed. The first pump is used to access the aggressor address (Row_2) and read out and reset its count value. In this example, the count value is reset to an initial value of 0. The next two pumps are used to refresh victim addresses based on the address of Row_2. In this case, the victim addresses are the adjacent rows, so Row_1 and Row_3 would be refreshed.

At the end of the third round 430, two row counts are over the threshold, for Row_1 and Row_4. However, since Row_4's count is higher than Row_1's count, the victims of Row_4 will be refreshed but not Row_1 as part of this refresh operation. At the end of the third round 430, a refresh management signal RFM is received, so only targeted refresh operations are performed. Three pumps are performed, one to reset the count value of Row_4, and then two pumps to refresh the adjacent rows (Row_3 and Row_5). Since Row_4's count has been reset, Row_1 is now the row with the highest count and will be reset as part of the next set of targeted refresh operations, unless another row's count passes it.

Figure 5:
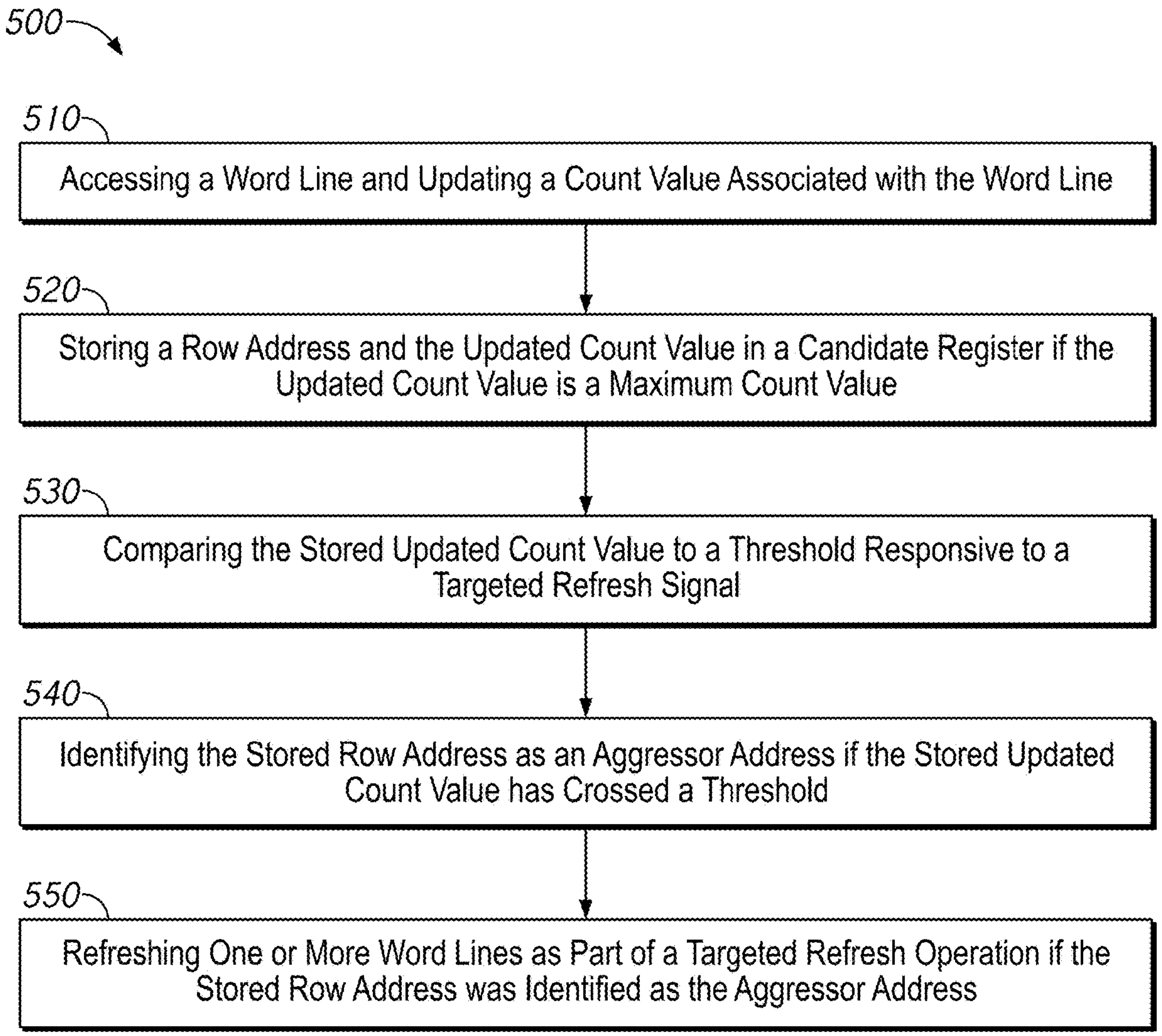
FIG. 5 is a flow chart of a method according to some embodiments of the present disclosure.

FIG. 5 is a flow chart of a method according to some embodiments of the present disclosure. The method 500 may, in some embodiments, be implemented by one or more of the systems or apparatuses described herein, such as the memory 100, 200, and/or 300 of FIGS. 1-3.

The method 500 may generally begin with block 510, which describes accessing a word line and updating a count value associated with the word line. The method 500 may include receiving a row address associated with the word line for example along a C/A terminal from a controller of a memory device. The method 500 may include activating the word line associated with the row address and reading the count value out from counter memory cells (e.g., 126 of FIGS. 1 and/or 226 of FIG. 2) out to a counter circuit (e.g., 246 of FIGS. 2 and/or 302 of FIG. 3). The counter circuit may update the count value (e.g., by incrementing the count value). The method 500 may include writing the updated count value back to the counter memory cells.

Box 510 may be followed by box 520, which describes storing a row address associated with the word line and the updated value in a candidate register (e.g., 244 of FIGS. 2 and/or 313/315 of FIG. 3) if the updated count value is a maximum count value. The row address may represent a maximum value of a plurality of count value stored in a bank of the memory array, each of which is associated with one of the plurality of word lines in the bank. In some embodiments, the method 500 may include storing a plurality of count values, which represent the highest count values of the plurality of count values in the bank.

Box 520 may include comparing the updated count value to the stored count value(s) in the candidate register. For example, a register management circuit (e.g., 245 of FIGS. 2 and/or 312/314 of FIG. 3) may perform the comparing. If the updated count value is greater than the stored count value, the stored count value may be replaced with the updated count value, and the row address may overwrite a previously stored address in the slot where the count value is stored.

Box 520 may be followed by box 530, which describes comparing the stored updated count value to a threshold responsive to a targeted refresh signal. The method 500 may include generating the targeted refresh signal based on a refresh management command or a refresh signal. For example, a refresh state control circuit (e.g., 242 of FIG. 2) may generate one or more activations of the targeted refresh signal responsive to the RFM command or responsive to having generated a number of activations of a sequential refresh signal (e.g., IREF). In some embodiments, the method 500 may include receiving a refresh signal and performing a number of sequential refresh operations and generating a number of activations of the targeted refresh signal. Box 530 may include comparing the highest count value stored in the candidate register to the threshold with the register management circuit.

Box 530 may be followed by box 540, which describes identifying the stored row address as an aggressor address if the stored updated count value has crossed the threshold. For example, the method 500 may include identifying the address in the candidate register with the highest count value as the aggressor if the count value has crossed the threshold.

If the highest count value has crossed the threshold, box 540 may be followed by box 550, which describes refreshing one or more word lines as part of a targeted refresh operation if the stored row address was identified as the aggressor address. The method 500 may include generating a refresh address based on the identified aggressor address (e.g., with a refresh address generator such as 250 of FIGS. 2 and/or 318 of FIG. 3). The method 500 may include performing a targeted refresh operation responsive to the refresh address and the targeted refresh signal.

The method 500 may include resetting count value responsive to identifying the stored row address as the aggressor address. For example, the resetting may include accessing the word line associated with the aggressor address, reading out the count value from the counter memory cells along that word line to the counter circuit, changing the count value (e.g., to reset it to an initial value such as 0) and writing the changed count value back to the counter memory cells. The resetting may be performed responsive to one of the activations of the targeted refresh signal.

If the highest count value has not crossed the threshold, then box 540 may be followed by skipping the targeted refresh operation. For example, when none of the stored count values have crossed the threshold, then the targeted refresh operation is skipped. For example, if no aggressor address is identified, the refresh address generator will not generate a refresh address responsive to the targeted refresh signal.

In some embodiments, the method 500 may include setting a value of the threshold. For example, the method 500 may include setting a threshold value in a mode register (e.g., 130 of FIG. 1) of the memory.

In some embodiments, the method 500 may include storing the row address in a first register or a second register (e.g., 313 or 315 of FIG. 3) if the updated count value is above a saved count value in that register. The method 500 may include comparing the stored updated count value in the first register to a first threshold when a first type of targeted refresh operation is called for (e.g., with a first type of targeted refresh signal) and comparing the stored updated count value in the second register to a second threshold when a second type of targeted refresh operation is called for (e.g., with a second type of targeted refresh signal). The two thresholds may be the same or different. The method 500 may include refreshing one or more word lines based on the stored address in the first register as part of the first type of targeted refresh operation or refreshing one or more word lines based on the stored address in the second register as part of the second type of targeted refresh operation.

It is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:

a memory device comprising:

a memory array comprising a plurality of word lines each associated with one of a plurality of row addresses and one of a plurality of count values;

an aggressor detector circuit configured to store a maximum of the plurality of count values and the associated row address, wherein the aggressor detector circuit is configured to receive a targeted refresh signal and compare the maximum count value to a threshold, and wherein the aggressor detector circuit is configured to provide the associated row address as an aggressor address if the maximum count value has crossed the threshold; and a refresh address generator circuit configured to provide a refresh address based on the aggressor address responsive to the targeted refresh signal, and further configured to skip providing the refresh address responsive to the targeted refresh signal if the aggressor detector circuit does not provide the aggressor address.

2. The apparatus of claim 1, wherein each of the plurality of word lines is configured to store an associated one of the plurality of count values in memory cells along the word line.

3. The apparatus of claim 1, further comprising a counter circuit configured to change one of the plurality of count values responsive to the associated one of the plurality of word lines being accessed.

4. The apparatus of claim 3, wherein the circuit is configured to reset a selected one of the plurality of count values associated with the aggressor address.

5. The apparatus of claim 1, wherein the aggressor detector circuit includes a candidate register configured to store a plurality of addresses, each associated with one of the highest of the plurality of count values.

6. The apparatus of claim 1, further comprising a mode register configured to store a threshold setting, wherein the threshold has a value based on the threshold setting.

7. An apparatus comprising:

a memory device comprising:

a memory array comprising a plurality of word lines;

a row decoder configured to access a selected one of the plurality of word lines based on a row address;

a counter circuit configured to receive a count value from the selected one of the plurality of word lines and update the count value;

an aggressor detector circuit configured to compare the updated count value to a stored count value, and to store the row address and the count value if the updated count value exceeds the stored count value, and configured to provide the stored row address as an aggressor address responsive to a targeted refresh signal if the stored count value has crossed a threshold; and a refresh address generator circuit configured to generate a refresh address based on the aggressor address and the targeted refresh signal, and further configured to skip generating the refresh address if the aggressor detector circuit does not provide the aggressor address, wherein the row decoder is configured to:

refresh at least one row based on the aggressor address responsive to the targeted refresh signal as part of a targeted refresh operation, refresh the at least one row based on the refresh address responsive to the targeted refresh signal, and skip the targeted refresh operation if the address generator circuit skips providing the refresh address.

8. The apparatus of claim 7, further comprising a mode register, wherein a value of the threshold is based on a setting in the mode register.

9. The apparatus of claim 7, wherein the aggressor detector circuit includes a candidate register configured to store the row address and the associated count value.

10. The apparatus of claim 9, further comprising a register management circuit configured to compare the updated count value to the stored count value in the candidate register.

11. The apparatus of claim 7, wherein the row decoder is configured to read out the count value responsive to the aggressor address and wherein the counter circuit is configured to reset the count value as part of the targeted refresh operation.

12. A method comprising:

accessing a word line of a memory device and updating a count value associated with the word line, wherein the count value is stored in the word line;

storing a row address and the updated count value in a candidate register of the memory device if the updated count value is a maximum count value;

comparing, with an aggressor detector circuit of the memory device, the stored updated count value to a threshold responsive to a targeted refresh signal;

identifying, with the aggressor detector circuit, the stored row address as an aggressor address when the stored updated count value has crossed the threshold;

responsive to the aggressor detector circuit identifying the aggressor address, generating, with a refresh address generator circuit, a refresh address based on the aggressor address and the targeted refresh signal;

refreshing one or more word lines as part of a targeted refresh operation responsive to the refresh address and the targeted refresh signal; and skipping generating the refresh address with the refresh address generator when the stored updated count value has not crossed the threshold; and skipping the targeted refresh operation if the stored updated count value has not crossed the threshold.

13. The method of claim 12, further comprising generating the targeted refresh signal responsive to a refresh management command or responsive to a refresh signal.

14. The method of claim 12, further comprising:

reading the count value from counter memory cells of the word line responsive to accessing the word line;

updating the count value with a counter circuit; and writing the updated count value to the counter memory cells.

15. The method of claim 14, further comprising:

reading the updated count value from the counter memory cells of the word line associated with the aggressor address responsive to the targeted refresh signal;

resetting the updated count value with the counter circuit; and writing the reset count value to the counter memory cells.

16. The method of claim 12 further comprising:

comparing the updated count value to a stored count value in the candidate register;

replacing the stored count value with the updated count value and replacing a stored row address with the row address if the updated count value is greater.

* * * * *